US012115786B2

(12) United States Patent
Kourai et al.

(10) Patent No.: US 12,115,786 B2
(45) Date of Patent: Oct. 15, 2024

(54) LIQUID DROPLET GENERATION METHOD

(71) Applicant: HITACHI, LTD., Tokyo (JP)

(72) Inventors: Yuusuke Kourai, Tokyo (JP); Mutsumi Suzuki, Tokyo (JP); Hirohisa Mizota, Tokyo (JP); Masanori Kitaoka, Tokyo (JP); Kota Sasaki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 159 days.

(21) Appl. No.: 17/926,198

(22) PCT Filed: May 6, 2021

(86) PCT No.: PCT/JP2021/017410
§ 371 (c)(1),
(2) Date: Nov. 18, 2022

(87) PCT Pub. No.: WO2021/256111
PCT Pub. Date: Dec. 23, 2021

(65) Prior Publication Data

US 2023/0173807 A1 Jun. 8, 2023

(30) Foreign Application Priority Data

Jun. 17, 2020 (JP) ................................ 2020-104874

(51) Int. Cl.
*B41J 2/14* (2006.01)
*B05B 17/06* (2006.01)
*B41J 2/015* (2006.01)

(52) U.S. Cl.
CPC ....... *B41J 2/14008* (2013.01); *B05B 17/0607* (2013.01); *B41J 2/015* (2013.01)

(58) Field of Classification Search
CPC ............ B41J 2/14008; B05B 17/0607; G01N 35/1074; G01N 2035/1034;
(Continued)

(56) References Cited

U.S. PATENT DOCUMENTS

| | | | |
|---|---|---|---|
| 2002/0063751 A1 | 5/2002 | Aizawa et al. | |
| 2008/0001003 A1 | 1/2008 | Onozawa | |
| 2020/0376515 A1 | 12/2020 | Nagaoka et al. | |

FOREIGN PATENT DOCUMENTS

| | | | |
|---|---|---|---|
| CA | 2753097 A1 * | 3/2012 | .......... B41J 2/04535 |
| JP | 11-300974 A | 11/1999 | |

(Continued)

OTHER PUBLICATIONS

International Search Report of PCT/JP2021/017410 dated Jul. 20, 2021.

*Primary Examiner* — Justin Seo
(74) *Attorney, Agent, or Firm* — MATTINGLY & MALUR, PC

(57) ABSTRACT

Provided is a liquid droplet generation method capable of generating liquid droplets having a diameter of 100 μm or more. The liquid droplet generation method for generating liquid droplets from a liquid layer 20 by using a plurality of transducers 18, the method including irradiating the liquid layer 20 with a plurality of ultrasonic waves from the plurality of transducers 18 to scatter primary liquid droplets 21A and 21B from the liquid layer 20, and causing the primary liquid droplets 21A and 21B being scattered to aggregate and grow into a secondary liquid droplet 22A.

2 Claims, 5 Drawing Sheets

(58) Field of Classification Search
CPC ....... G01N 35/1009; G01N 2035/1039; G01N 35/028; B01L 2400/0436; B01L 3/0268
See application file for complete search history.

(56) References Cited

FOREIGN PATENT DOCUMENTS

| | | | |
|---|---|---|---|
| JP | 2000-79682 | A | 3/2000 |
| JP | 2001-179962 | A | 7/2001 |
| JP | 2002-166541 | A | 6/2002 |
| JP | 2002-200447 | A | 7/2002 |
| JP | 2003-53217 | A | 2/2003 |
| JP | 2008-6644 | A | 1/2008 |
| JP | 2010-52316 | A | 3/2010 |
| JP | 2020-196930 | A | 12/2020 |

* cited by examiner

LIQUID DROPLET GENERATION METHOD

TECHNICAL FIELD

The present invention relates to a liquid droplet generation method for generating liquid droplets from a liquid layer using a plurality of transducers.

BACKGROUND ART

In the field of biochemistry, pipettes, for example, are used to extract liquid droplets from a liquid layer (specifically, blood, reagent liquid, or the like) in a container. Pipettes suction and discharge liquid droplets using air pressure.

In inkjet printers, a plurality of transducers, for example, are used to discharge liquid droplets from a liquid layer (specifically, ink) in a container (see PTL 1, for example). In PTL 1, a liquid layer is irradiated with a plurality of ultrasonic waves from a plurality of transducers. In this process, the ultrasonic waves from respective transducers are focused by using an acoustic lens. Further, the plurality of ultrasonic waves are converged at one focal point by making the signal application timings (phases) for the plurality of transducers different from each other, and this focal point is located on the surface of the liquid layer. This causes one liquid droplet to be discharged from the liquid layer.

CITATION LIST

Patent Literature

PTL 1: JP 2001-179962 A

SUMMARY OF INVENTION

Technical Problem

In the liquid droplet generation method of PTL 1, it is possible to generate liquid droplets having a diameter of less than 100 μm, but it is difficult to generate liquid droplets having a diameter of 100 μm or more. Even though the signal application time for each of the plurality of transducers are excessively lengthened, the lengthened time merely inhibits the generation of liquid droplets. Thus, the method cannot be adopted in the field of biochemistry, for example.

An object of the present invention is to provide a liquid droplet generation method capable of generating liquid droplets having a diameter of 100 μm or more.

Solution to Problem

To achieve the above object, the present invention is a liquid droplet generation method for generating liquid droplets from a liquid layer by using a plurality of transducers, the method including irradiating a liquid layer with a plurality of ultrasonic waves from the plurality of transducers to scatter a plurality of primary liquid droplets from the liquid layer, and causing the plurality of primary liquid droplets being scattered to aggregate and grow into a secondary liquid droplet.

Advantageous Effects of Invention

The present invention can achieve generation of liquid droplets having a diameter of 100 μm or more.

DESCRIPTION OF EMBODIMENTS

An embodiment of the present invention will be described with reference to the drawings.

Figure 1:
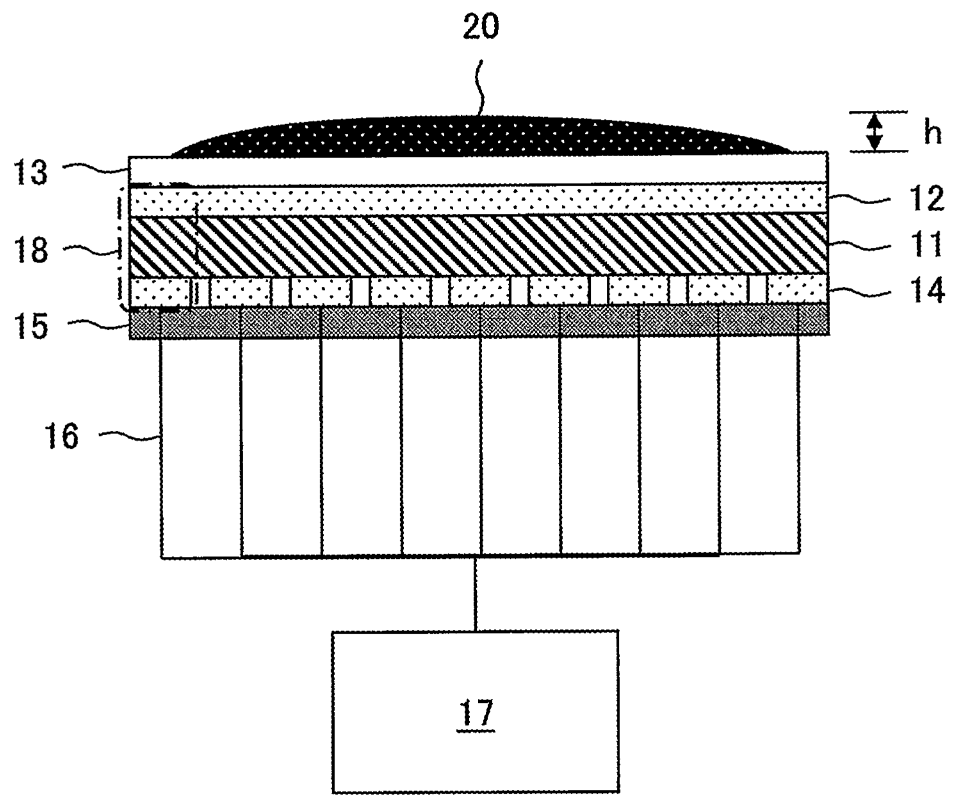
FIG. 1 is a schematic view illustrating a structure of a liquid droplet generation device according to an embodiment of the present invention.

FIG. 1 is a schematic view illustrating a structure of a liquid droplet generation device according to the embodiment.

The liquid droplet generation device includes a piezoelectric element 11 having a flat plate shape, a ground electrode 12 provided on an upper surface side of the piezoelectric element 11, a protective film 13 bonded to an upper surface side of the ground electrode 12, a plurality of signal electrodes 14 provided on a lower surface side of the piezoelectric element 11 and arranged in one direction, a resin 15 bonded to a lower surface side of the plurality of signal electrodes 14, and a drive circuit 17 connected to the plurality of signal electrodes 14 via a plurality of signal lines 16.

The protective film 13 is a thin film formed of metal or resin. A liquid layer 20 is placed on an upper surface side of the protective film 13.

For the piezoelectric element 11, for example, a ceramic such as lead zirconate titanate or lead titanate, a material such as zinc oxide or lithium niobate, or a composite (composite material) is used. For the ground electrode 12 and the signal electrodes 14, for example, a material such as gold, silver, copper, platinum, titanium, or aluminum is used.

One of the plurality of signal electrodes 14, a part of the piezoelectric element 11, the part corresponding to the signal electrode 14, and a part of the ground electrode 12, the part corresponding to the signal electrode 14 constitute a transducer 18. That is, the liquid droplet generation device includes a plurality of transducers 18.

Figure 2:
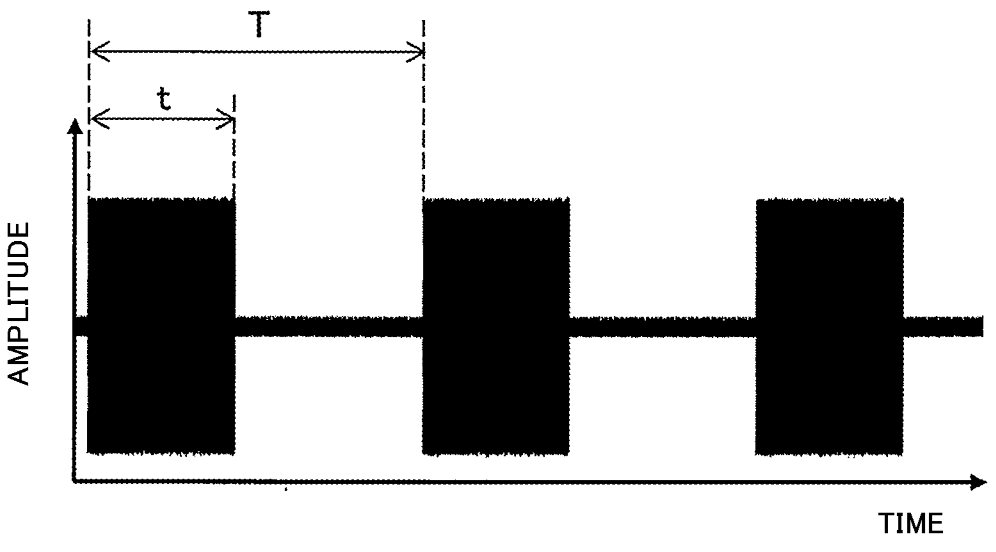
FIG. 2 is a diagram illustrating a specific example of electric signals according to the embodiment of the present invention.

The drive circuit 17 applies electric signals to the transducers 18 via the signal lines 16 at a predetermined period T and a predetermined time t as illustrated in FIG. 2, for example. The signal application time t is 10 ms or more. The transducers 18 oscillate with the electric signals and emit ultrasonic waves.

The drive circuit 17 selects two or more transducers 18, applies electric signals to the transducers 18, and controls the signal application timing (phase). For example, a plurality of ultrasonic waves are emitted in a vertical direction by matching the signal application timings for the plurality of transducers 18 with each other. This causes liquid droplets to be generated from the liquid layer 20 and to be emitted in the vertical direction (details will be described later). Alternatively, for example, the plurality of ultrasonic waves are converged at a focal point by making the signal application timings for the plurality of transducers 18 different from each other. This causes liquid droplets to be generated from the liquid layer 20 and to be emitted in oblique directions (details will be described later). The thickness h (see FIG. 1) of the liquid layer 20 is 50% or less of the distance d (see FIG. 5 described later) of the focal point.

The operation of the liquid droplet generation device (that is, a liquid droplet generation method) of the embodiment will be described.

Figure 3:
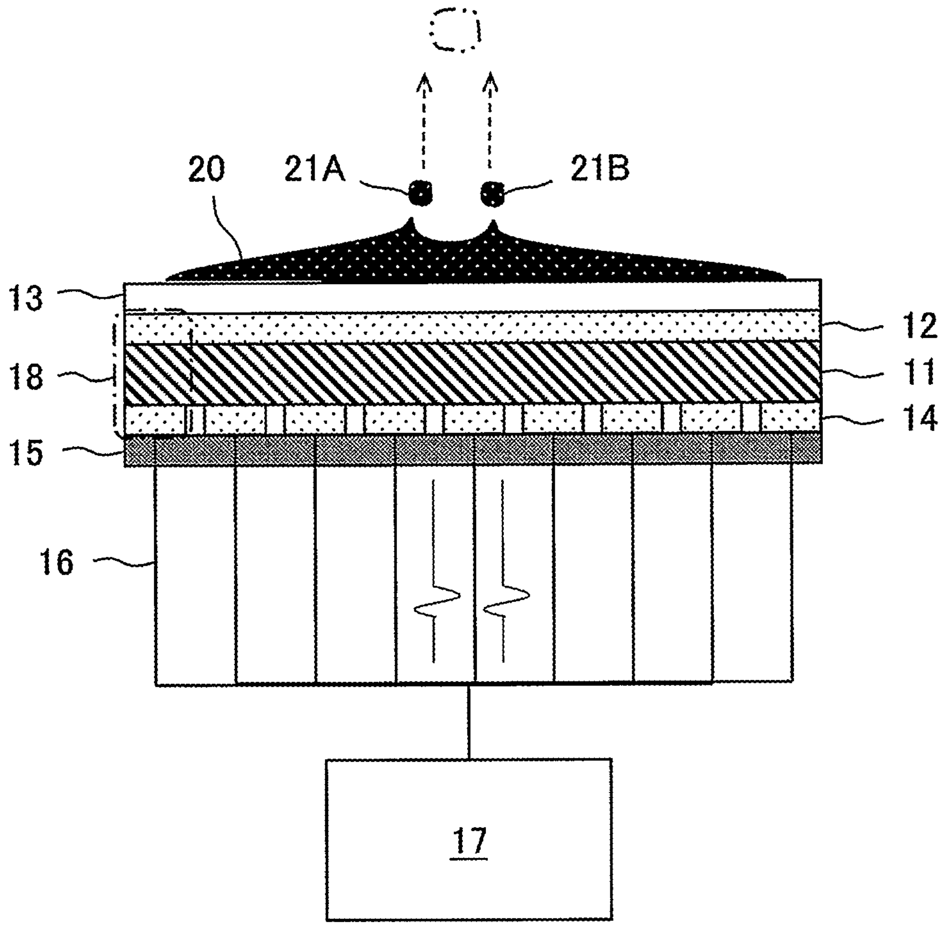
FIG. 3 is a schematic view illustrating an operation of the liquid droplet generation device according to the embodiment of the present invention, showing a first process in a case where liquid droplets are emitted in a vertical direction.
Figure 4:
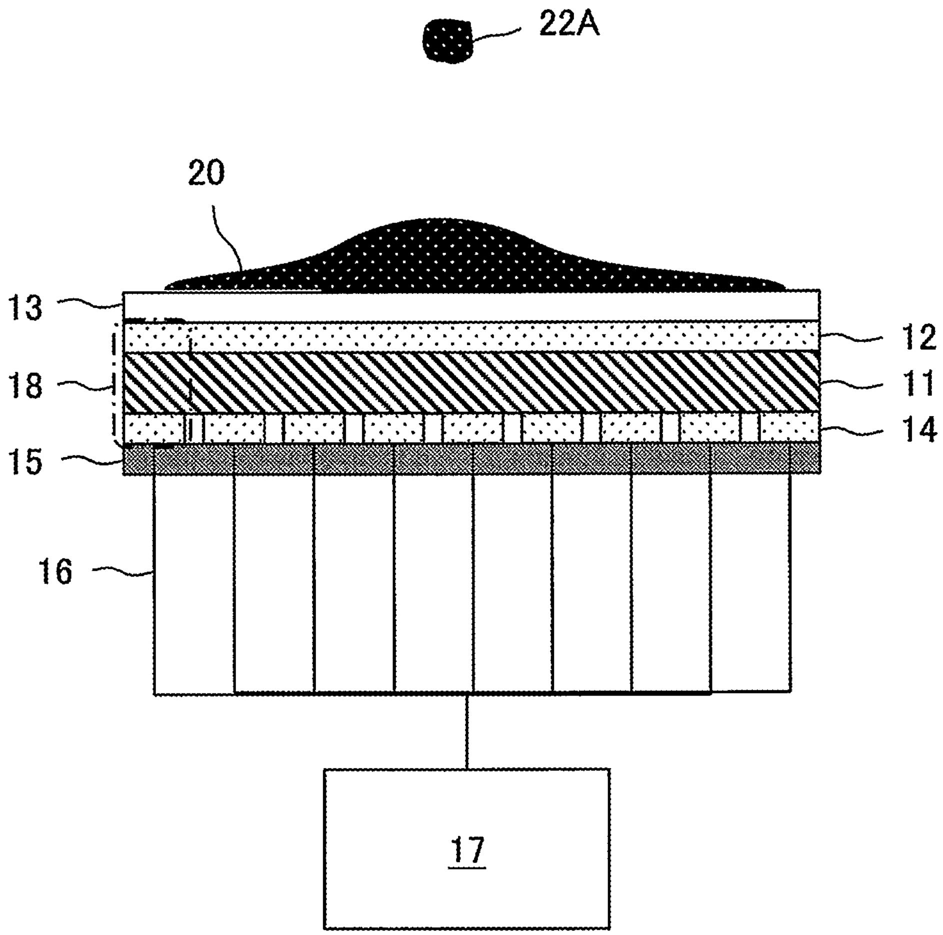
FIG. 4 is a schematic view illustrating an operation of the liquid droplet generation device according to the embodiment of the present invention, showing a second process in the case where liquid droplets are emitted in a vertical direction.

First, a case where liquid droplets are emitted in the vertical direction will be described with reference to FIGS. 3 and 4. The drive circuit 17 applies electric signals to, for example, two of the transducers 18 at the same signal application timing for the two transducers 18. Then, the two transducers 18 irradiate the liquid layer 20 with two ultrasonic waves to cause primary liquid droplets 21A and 21B to scatter from the liquid layer 20. The primary liquid droplets 21A and 21B scatter in directions substantially parallel to each other. However, the interval between the primary liquid droplets 21A and 21B adjacent to each other corresponds to the interval between transducers 18 adjacent to each other and is slightly larger than the diameter of each primary liquid droplet. Thus, the scattering primary liquid droplets 21A and 21B aggregate and grow into a secondary liquid droplet 22A.

Figure 5:
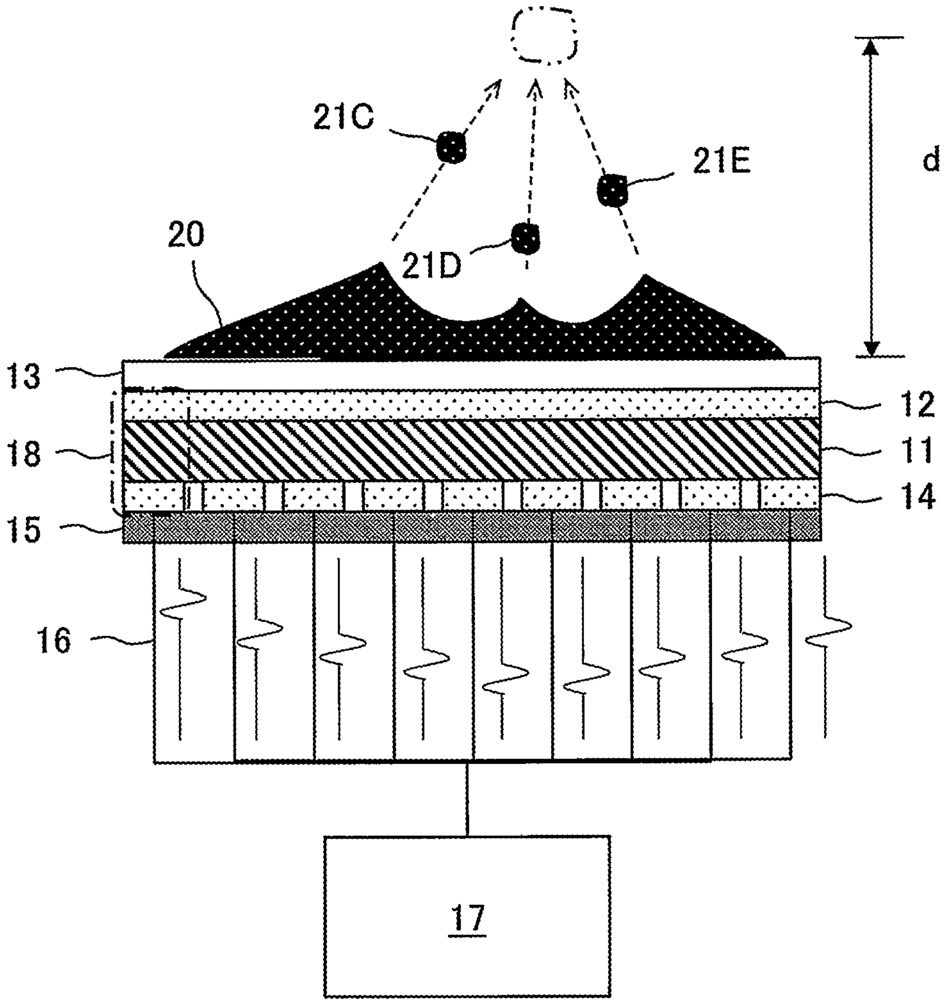
FIG. 5 is a schematic view illustrating an operation of the liquid droplet generation device according to the embodiment of the present invention, showing a first process in a case where liquid droplets are emitted in oblique directions.
Figure 6:
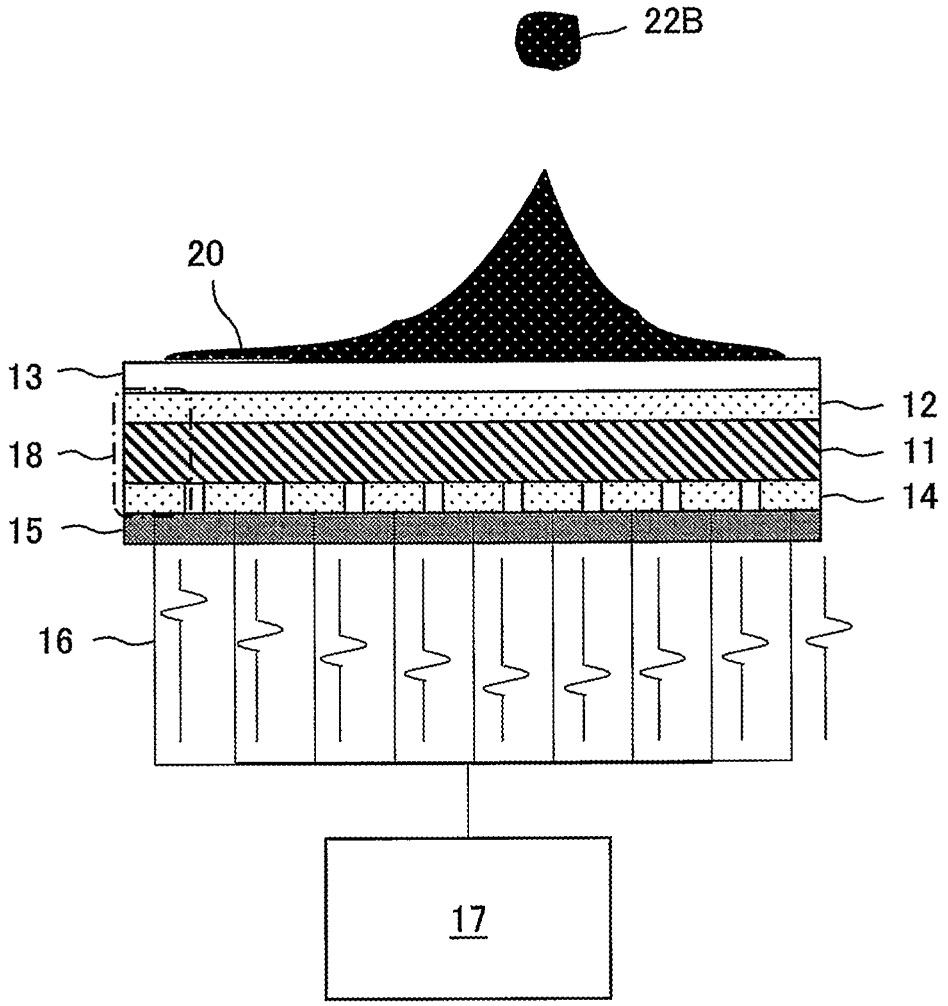
FIG. 6 is a schematic view illustrating an operation of the liquid droplet generation device according to the embodiment of the present invention, showing a second process in the case where liquid droplets are emitted in oblique directions.

Next, a case where liquid droplets are emitted in oblique directions will be described with reference to FIGS. 5 and 6. The drive circuit 17 applies electric signals to, for example, nine of the transducers 18 at signal application timings different for the nine transducers 18. Then, the nine transducers 18 irradiate the liquid layer 20 with nine ultrasonic waves to cause primary liquid droplets 21C, 21D, and 21E to scatter from the liquid layer 20. The primary liquid droplets 21C, 21D, and 21E scatter toward the focal point described above. Thus, the scattering primary liquid droplets 21C, 21D, and 21E aggregate and grow into a secondary liquid droplet 22B.

In the present embodiment, liquid droplets having a diameter of 100 μm or more can be generated by the above-described liquid droplet generation method.

The liquid droplet generation device of the embodiment has been described by taking the case where one piezoelectric element and one ground electrode are provided (that is, a case where each transducer includes a signal electrode, a part of a piezoelectric element, and a part of a ground electrode, the parts corresponding to the signal electrode) as an example, but the present invention is not limited to this example. The liquid droplet generation device may include a plurality of piezoelectric elements or may include a plurality of ground electrodes. That is, each transducer may include a signal electrode, a piezoelectric element, and a part of a ground electrode, the part corresponding to the signal electrode and the piezoelectric element. Each transducer may include a signal electrode, a ground electrode, and a part of a piezoelectric element, the part corresponding to the signal electrode and the ground electrode. Each transducer may include a signal electrode, a piezoelectric element, and a ground electrode.

REFERENCE SIGNS LIST

18 transducer
20 liquid layer
21A to 21E primary liquid droplet
22A, 22B secondary liquid droplet

The invention claimed is:

1. A liquid droplet generation method for generating liquid droplets from a liquid layer by using a plurality of transducers, the method comprising:
- irradiating the liquid layer with a plurality of ultrasonic waves from the plurality of transducers to scatter a plurality of primary liquid droplets from the liquid layer;
- causing the plurality of primary liquid droplets being scattered to aggregate and grow into a secondary liquid droplet; and
- wherein a signal application time for each of the plurality of transducers is 10 ms or more.

2. A liquid droplet generation method for generating liquid droplets from a liquid layer by using a plurality of transducers, the method comprising:
- irradiating the liquid layer with a plurality of ultrasonic waves from the plurality of transducers to scatter a plurality of primary liquid droplets from the liquid layer;
- causing the plurality of primary liquid droplets being scattered to aggregate and grow into a secondary liquid droplet; and wherein
- signal application timing is different for each of the plurality of transducers to converge the plurality of ultrasonic waves at a focal point, and
- the liquid layer has a thickness of 50% or less of a distance of the focal point.

* * * * *